United States Patent
Liu

(10) Patent No.: US 9,438,905 B2
(45) Date of Patent: Sep. 6, 2016

(54) LM MODE WITH UNIFORM BIT-WIDTH MULTIPLIERS

(71) Applicant: Futurewei Technologies, Inc., Plano, TX (US)

(72) Inventor: Lingzhi Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 269 days.

(21) Appl. No.: 13/802,525

(22) Filed: Mar. 13, 2013

(65) Prior Publication Data

US 2013/0272396 A1 Oct. 17, 2013

Related U.S. Application Data

(60) Provisional application No. 61/623,249, filed on Apr. 12, 2012.

(51) Int. Cl.
*H04N 11/02* (2006.01)
*H04N 19/50* (2014.01)
*H04N 19/593* (2014.01)

(52) U.S. Cl.
CPC ........ *H04N 19/00569* (2013.01); *H04N 19/50* (2014.11); *H04N 19/593* (2014.11)

(58) Field of Classification Search
USPC ..................................... 375/240.01–240.12
See application file for complete search history.

(56) References Cited

U.S. PATENT DOCUMENTS

2012/0287995 A1* 11/2012 Budagavi ................. 375/240.12

FOREIGN PATENT DOCUMENTS

WO 2011126348 A2 10/2011

OTHER PUBLICATIONS

Chen, et al., "CE6.a.4: Chroma Intra Prediction by Reconstructed Luma Samples," Joint Collaborative Team on Video Coding (JCT-VC) of ITU-T SG16 WP3 and ISO/IEC JTC1/SC29/WG11, Document JTCVC-E266, 5th Meeting: Geneva, Mar. 16-23, 2011, 10 pages.

Bross, et a., "WD5: Working Draft 5 of High-Efficiency Video Coding," Joint Collaborative Tem on Video Coding (JCT-VC) of ITU-T SG16 WP3 and ISO/IEC JTC1/SC29/WG11, Document JCTVC-G1103_d, 7th Meeting: Geneva, CH, Nov. 21-30, 2011, 237 pages.

Liu, et al., "Non-CE6a: Remove the Large Multiplier for LM Mode Calculation," Joint Collaborative Team on Video Coding (JCT-VC) of ITU-T SG16 WP3 and ISO/IEC JTC1/SC29/WG11, Document: JCTVC-H0491, 8th Meeting: San Jose, CA, Feb. 1-10, 2012, 9 pages.

(Continued)

*Primary Examiner* — Leron Beck
(74) *Attorney, Agent, or Firm* — Conley Rose, P.C.; Grant Rodolph; William H. Dietrich

(57) ABSTRACT

A video codec able to generate a predicted chroma sample for a chroma block based on reconstructed luma samples and reconstructed chroma samples. The reconstructed luma samples are located in neighboring blocks of a corresponding reconstructed luma block and adjacent to the corresponding reconstructed luma block. The reconstructed chroma samples are located in neighboring blocks of the chroma block and adjacent to the chroma block. The predicted chroma sample is generated by computing multipliers. Each of the multipliers has a bit width no greater than an input bit depth of the chroma block. The predicted chroma sample is generated without the need for any multiplier having a bit width greater than the input bit depth of the chroma block.

8 Claims, 5 Drawing Sheets

(56) References Cited

OTHER PUBLICATIONS

Bross, et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, Document JCTVC-H1003, 8th Meeting: San Jose, CA, Feb. 1-10, 2012, 259 pages.

Foreign Communication From a Counterpart Application, PCT Application No. PCT/US2013/036347, International Search Report dated May 12, 2014, 4 pages.

Foreign Communication From a Counterpart Application, PCT Application No. PCT/US2013/036347, Written Opinion dated May 12, 2014, 5 pages.

* cited by examiner

LM MODE WITH UNIFORM BIT-WIDTH MULTIPLIERS

CROSS-REFERENCE TO RELATED APPLICATIONS

The present application claims priority to U.S. Provisional Patent Application No. 61/623,249 filed Apr. 12, 2012 by Lingzhi Liu and entitled "LM Mode with Uniform Bit-Width Multipliers", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed before being communicated across modern day telecommunication networks. Video compression devices often use software and/or hardware at the source to code the video data prior to transmission, thereby decreasing the quantity of data needed to represent digital video images. The compressed data is then received at the destination by a video decompression device that decodes the video data. Due to limited network resources, it is desirable to develop compression and decompression techniques that increase compression ratios and/or reducing implementation complexity without substantially sacrificing image quality. For example, existing algorithms for chroma from luma prediction mode (often referred to as a linear model or method (LM) mode) require many complex computations. Thus, there is a need to reduce the computational complexity of the LM mode.

SUMMARY

In one embodiment, the disclosure includes a video codec (encoder and/or decoder) comprising a processor configured to generate a predicted chroma sample for a chroma block based on a plurality of reconstructed luma samples located in neighboring blocks of a corresponding reconstructed luma block and adjacent to the corresponding reconstructed luma block, and a plurality of reconstructed chroma samples located in neighboring blocks of the chroma block and adjacent to the chroma block, wherein generating the predicted chroma sample comprises computing a plurality of multipliers, wherein each of the plurality of multipliers has a bit width no greater than an input bit depth of the chroma block, and wherein generating the predicted chroma sample does not require any multiplier that has a bit width greater than the input bit depth of the chroma block.

In another embodiment, the disclosure includes a method used in video coding comprising generating a predicted chroma sample for a chroma block based on a plurality of reconstructed luma samples located in neighboring blocks of a corresponding reconstructed luma block and adjacent to the corresponding reconstructed luma block, and a plurality of reconstructed chroma samples located in neighboring blocks of the chroma block and adjacent to the chroma block, wherein generating the predicted chroma sample comprises computing a plurality of multipliers, wherein each of the plurality of multipliers has a bit width no greater than an input bit depth of the chroma block, and wherein generating the predicted chroma sample does not require any multiplier that has a bit width greater than the input bit depth of the chroma block.

In yet another embodiment, the disclosure includes an apparatus used in video coding comprising a processor configured to compute a flooring function of an average of a plurality of reconstructed chroma samples located in neighboring blocks of a chroma block and adjacent to the chroma block, compute a flooring function of an average of a plurality of reconstructed luma samples located in neighboring blocks of a corresponding reconstructed luma block and adjacent to the corresponding reconstructed luma block, wherein the first and second flooring functions are first and second multipliers, compute a number of additional multipliers, at least some of which are based on the plurality of reconstructed chroma samples and the plurality of reconstructed luma samples, and compute a predicted chroma sample for the chroma block based on all of the multipliers, wherein each of the multipliers has a bit width no greater than an input bit depth of the chroma block, and wherein computing the predicted chroma sample does not require any multiplier that has a bit width greater than the input bit depth of the chroma block.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
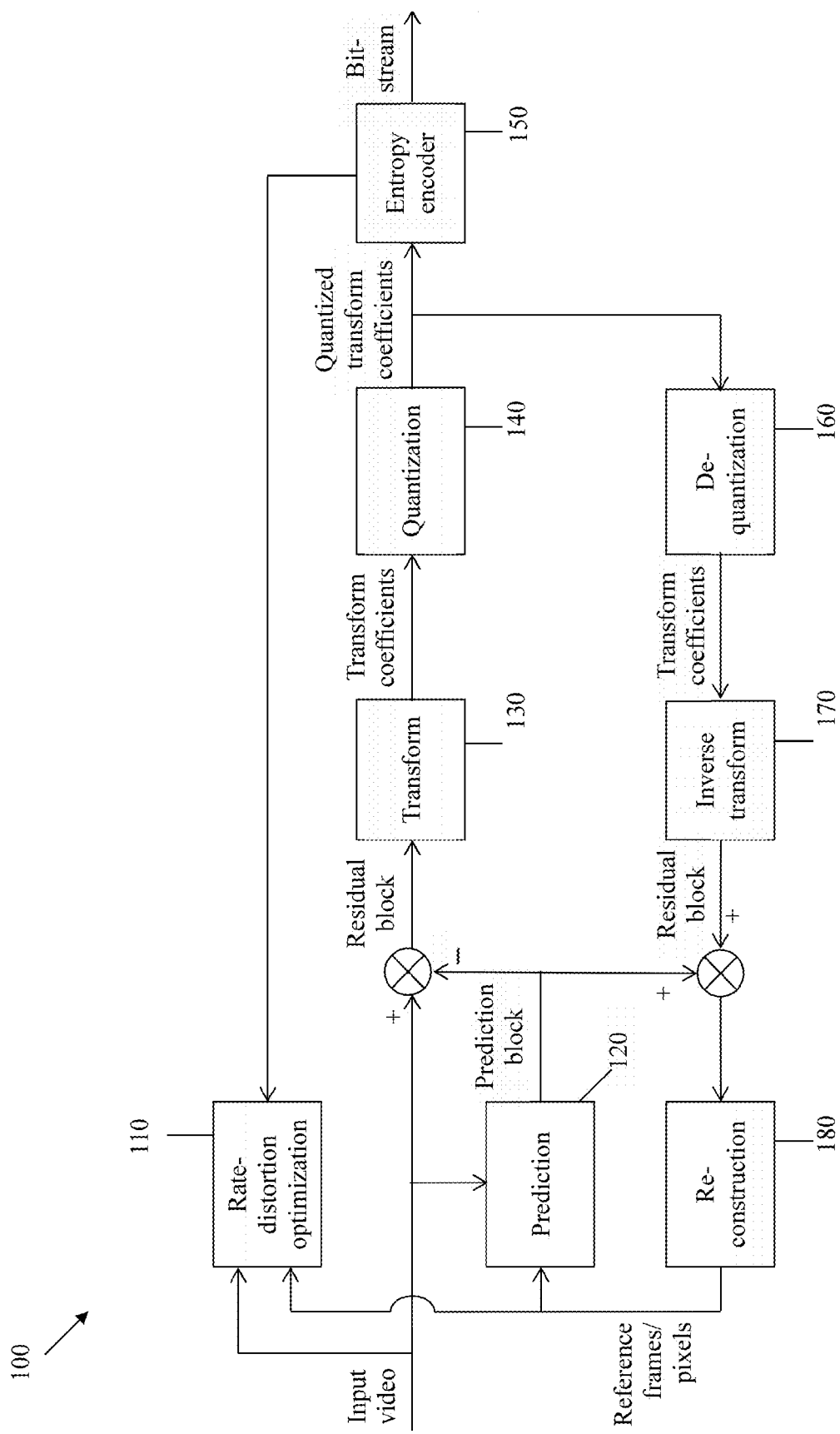
FIG. 1 is a schematic diagram of an embodiment of a video encoding system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . , 255) that represents an image quality or color at the corresponding reference point. The color space may be represented by three components including a luminance (luma or Y) component and two chrominance (chroma) components, denoted as Cb and Cr (or sometimes as U and V). A luma or chroma integer value is typically stored and processed in binary form using bits. The number of bits used to indicate a luma or chroma value may be referred to as a bit depth or color depth.

In use, an image or video frame may comprise a large amount of pixels (e.g., 2,073,600 pixels in a 1920×1080 frame), thus it may be cumbersome and inefficient to encode and decode (generally referred to hereinafter as code) each pixel independently. To improve coding efficiency, a video frame is usually broken into a plurality of rectangular blocks or macroblocks, which may serve as basic units of processing such as coding, prediction, transform, and quantization. For example, a typical N×N block may comprise $N^2$ pixels, where N is an integer greater than one and is often a multiple of four. In the YUV or YCbCr color space, each luma (Y) block corresponds to two chroma blocks including a Cb block and a Cr block. The Cb block and Cr block also correspond to each other. The chroma blocks and their corresponding luma block are may be located in a same relative position of a video frame, slice, or region.

In video coding, various sampling rates may be used to code the YCbCr components. The size of a Cb block, its corresponding Cr block, and/or its corresponding Y block may be the same or different depending on a sampling rate. For example, in a 4:2:0 sampling rate, each N×N chroma (Cb or Cr) block may correspond to a 2N×2N luma block. In this case, a width or height of the chroma block is half that of the corresponding luma block. The chroma components are downsampled or subsampled, since human eyes may be less sensitive to chroma components than to the luma component. For another example, in a 4:4:4 sampling rate, each N×N chroma (Cb or Cr) block may correspond to a N×N luma block. In this case, higher video fidelity may be preserved, but more data may need to be coded. Other sampling rates, such as 4:2:2, 4:2:1, etc., may also be used.

A block in a video frame may be spatially correlated with other blocks within the same frame such that pixel values across some blocks may vary only slightly and/or exhibit repetitious textures. Modern methods of video-compression exploit these spatial correlations using various techniques which may be known collectively as intra-frame prediction (or in short as intra prediction). When coding a current block using intra prediction, a prediction block or prediction unit is generated based on one or more previously coded reference blocks. The prediction block may be an estimated version of the current block. A residual block may be generated by subtracting the current block from the prediction block, or vice versa, which represents prediction residuals or errors. Since an amount of data needed to represent the prediction residuals may typically be less than an amount of data needed to represent the original block, the residual block may be coded instead of the current block to achieve a higher compression ratio.

Intra prediction may be implemented by a video encoder or decoder (generally referred to herein as a codec). In the encoder, a residual block generated by intra prediction may be transformed, quantized, and scanned before being included into an encoded data stream. Upon reception of the encoded data stream, a decoder may add a reconstructed residual block to an independently generated prediction block to recreate the current block. Although the recreated current block may be an imperfect version of the original current block, e.g., due to quantization, their differences may be hardly perceptible to the human eye. Thus, substantial bit savings may be derived without significantly degrading the quality of the reconstructed image.

In a video region where neighboring blocks are identical or near-identical, use of intra prediction may result in a residual block comprising many zero and/or near-zero pixel values. Furthermore, transformation, quantization, and/or scanning of the residual block may remove many of the zero and/or near-zero coefficients from the encoded data stream, thereby resulting in further compression of video data. Thus, more accurate prediction of the original image may result in higher coding efficiencies. To improve accuracy of intra prediction, video/image coding standards may utilize a plurality of intra prediction modes. For example, up to six intra prediction modes may be used for the chroma components (including Cr and Cb) in HEVC, which is poised to be the next video standard issued by the Joint Collaborative Team on Video Coding (JCT-VC) of the International Telecommunications Union (ITU) Telecommunications Standardization Sector (ITU-T) and International Organization for Standardization (ISO)/International Electrotechnical Commission (IEC) Moving Picture Experts Group (MPEG).

For the chroma components, six intra prediction modes may include a chroma from luma prediction mode (often referred to as the LM mode), a vertical prediction mode, a horizontal prediction mode, a diagonal mode, a direct current (DC) prediction mode, and a direct mode (DM) derived from the luma component. Various algorithms may be used to determine an optimal intra prediction mode for a chroma block. For example, an encoder may test an intra predicting chroma block using some or all of the available modes, and then calculate a sum of absolute error (SAE) for each prediction mode. The prediction mode leading to the smallest SAE may be selected as the optimal mode. It should be noted that in a final HEVC standard to be issued, the intra prediction modes used for the chroma components may be different from the six aforementioned modes. The present disclosure mainly relates to the LM mode.

According to a HEVC work draft entitled "WD5: Working Draft 5 of High-Efficiency Video Coding" with document number: JCTVC-G1103_d9, which is hereby incorporated by reference, a current design of LM mode utilizes reconstructed luma samples or pixels to generate chroma samples. Specifically, when a LM mode is to be implemented to generate a prediction block for a current chroma (Cb or Cr) block, the LM mode includes obtaining a linear combination of previously reconstructed luma samples that have been interpolated from within a corresponding luma block of the current chroma block. The LM mode further includes obtaining a linear combination of previously reconstructed luma samples from luma blocks which neighbor the corresponding luma block. In addition, the LM mode further includes obtaining previously reconstructed chroma samples from chroma blocks which neighbor the current chroma block.

According to JCTVC-G1103_d9, sample values of the chroma prediction block may be derived using algorithms and/or equations (1) to (19) described in paragraphs below. Before getting to the equations, definitions of variables used in equations herein are given first.

For a reconstructed luma block with 2nS (nS is a positive integer) luma samples on each of its four sides, [x, y]

denotes a position or index of a luma sample in the reconstructed luma block, wherein both integers x and y range from 0 to 2nS−1. Further, recSamples$_L$[x, y] denotes a luma sample at position [x, y]. In HEVC working drafts (e.g., Document JCTVC-G1103_d9), recSamples$_L$[x, y] may sometimes also be denoted as P$_{LM}$[x, y]. In equations herein, notation: m=n . . . k is used to suggest a range of values, wherein m starts from n (including n) and ends with k (including k), and wherein m, n, and k are all integers. For instance, x and y ranging from 0 to 2nS−1 is denoted as "x, y=0 . . . 2nS−1".

As mentioned above, reconstructed luma samples in the left and top neighboring luma blocks may also be used in the LM mode to predict the current chroma block. [x, −1] denotes a position or index of a luma sample in a column left to and adjacent the corresponding luma block (referred to hereafter as the left neighboring column), and [−1, y] denotes a position of a luma sample in the row above and adjacent the corresponding luma block (referred to hereafter as the top neighboring row), wherein both x and y range from 0 to 2nS−1. Further, recSamples$_L$[x, −1] denotes a luma sample at position [x, −1], and recSamples$_L$[−1, y] denotes a luma sample at position [−1, y].

In 4:2:0 sampling, the reconstructed 2nS×2nS corresponding luma block may be first filtered to an nS×nS luma block, which is then used as a reference block for intra prediction of the current chroma block. For the filtered luma block with nS luma samples on each of its four sides, p$_Y$[x, y] denotes a filtered luma sample at position [x, y] wherein both x and y range from 0 to nS−1. Similarly, the left neighboring column and the top neighboring row comprising luma samples may also be first filtered before used reference samples in the LM mode. After filtering, p$_Y$[x, −1] denotes a filtered luma sample at position [x, −1], and p$_Y$[−1, y] denotes a value of a filtered luma sample at position [−1, y], wherein both x and y range from 0 to nS−1.

As mentioned above, previously coded chroma samples in the left and top neighboring chroma blocks may also be used in the LM mode. In the neighboring chroma blocks, [x, −1] denotes an index of a chroma sample in a column left to and adjacent the current chroma block (also referred to as the left neighboring column), and [−1, y] denotes an index of a chroma sample in the row above and adjacent the current chroma block (also referred to as the top neighboring row), wherein both x and y range from 0 to nS−1. Further, p[x, −1] denotes a chroma sample at position [x, −1], and p[−1, y] denotes a chroma sample at position [−1, y], wherein both x and y range from 0 to nS−1.

For the chroma prediction block to be computed, predSamples[x, y] denotes a prediction or predicted chroma sample at position [x, y], wherein x and y range from 0 to nS−1. BitDepthC denotes a number of bits (i.e., bit depth) used for the chroma component (Cr or Cb). For example, in HEVC, BitDepthC may equal 8 or 10 (or any other suitable value). If BitDepthC=8, chroma samples such as p[x, y] and predSamples[x, y] may have a maximum of 8 bits. In use, the luma component may typically have a same bit depth as the chroma component, thus filtered luma samples such as p$_Y$[x, y] have a same maximum number of bits as p[x, y].

In the LM mode, to generate predicted chroma samples, the reconstructed luma samples are filtered first. Equation (1) applies a 3-tap filter with [1 2 1] coefficients to 2nS reconstructed luma samples located in the left neighboring column and produces nS filtered luma samples. Equation (2) applies a 2-tap averaging filter to 2nS reconstructed luma samples in the top neighboring row and produces nS filtered luma samples. Equation (3) applies a 2-tap averaging filter to 2nS×2nS reconstructed luma samples in the corresponding luma block and produces nS×nS filtered luma samples.

$$p_Y[x,-1] = (\text{recSamples}_L[2x-1,-1] + 2*\text{recSamples}_L[2x,-1] + \text{recSamples}_L[2x+1,-1]+2) >> 2, \text{ with } x=0 \ldots nS-1 \quad (1)$$

$$p_Y[-1,y] = (\text{recSamples}_L[-1,2y] + \text{recSamples}_L[-1,2y+1]) >> 1, \text{ with } y=0 \ldots nS-1 \quad (2)$$

$$p_Y[x,y] = (\text{recSamples}_L[2x,2y] + \text{recSamples}_L[2x,2y+1]) >> 1, \text{ with } x,y=0 \ldots nS-1 \quad (3)$$

Next, predicted chroma samples (i.e., predSamples[x, y], with x, y=0 . . . nS−1) can be computed via intermediate variables, denoted alpha (α) and beta (β), using equations:

$$\text{alpha} = \left[ 2*nS * \left( \sum_{y=0}^{nS-1} p'_Y[-1,y]*p[-1,y] + \sum_{x=0}^{nS-1} p'_Y[x,-1]*p[x,-1] \right) - \left( \sum_{y=0}^{nS-1} p'_Y[-1,y] + \sum_{x=0}^{nS-1} p'_Y[x,-1] \right) \left( \sum_{y=0}^{nS-1} p[-1,y] + \sum_{x=0}^{nS-1} p[x,-1] \right) \right] / \left[ 2*nS * \left( \sum_{y=0}^{nS-1} p'_Y[-1,y]^2 + \sum_{x=0}^{nS-1} p'_Y[x,-1]^2 \right) - \left( \sum_{x=0}^{nS-1} p'_Y[-1,y] + \sum_{x=0}^{nS-1} p'_Y[x,-1] \right)^2 \right] \quad (4)$$

$$\text{beta} = \frac{\left( \sum_{y=0}^{nS-1} p[-1,y] + \sum_{x=0}^{nS-1} p[x,-1] \right) - \text{alpha}*\left( \sum_{y=0}^{nS-1} p'_Y[-1,y] + \sum_{y=0}^{nS-1} p'_Y[x,-1] \right)}{2*nS} \quad (5)$$

$$\text{predSamples}[x,y] = \text{alpha}*p'_Y[x,y] + \text{beta, with } x, y = 0..nS-1 \quad (6)$$

From equations (4) to (6), note that the final value of a prediction chroma sample depends on both the luma and chroma components which have already been coded. In the luma component, filtered luma samples in the left neighboring column, top neighboring row, and corresponding luma block are taken into account. In the chroma component, reconstructed chroma samples in the left neighboring column and top neighboring row are taken into account.

The computation of alpha in equation (4) and beta in equation (5) may be overly complex to implement, thus in practice after obtaining filtered luma samples (i.e., p$_Y$[x, y]) using equations (1) to (3), more intermediate variables are introduced to derive predicted chroma samples (i.e., predSamples[x, y]). Further, instead of divisional operations, integer and/or bit-wise operations are used. For example, intermediate variables, denoted as k3, L, C, LL, LC, and k2, are derived as follows:

$$k3 = \text{Max}(0, BitDepth_C + \log_2(nS) - 14) \qquad (7)$$

$$L = \left(\sum_{y=0}^{nS-1} p'_Y[-1, y] + \sum_{x=0}^{nS-1} p'_Y[x, -1]\right) >> k3 \qquad (8)$$

$$C = \left(\sum_{y=0}^{nS-1} p[-1, y] + \sum_{x=0}^{nS-1} p[x, -1]\right) >> k3 \qquad (9)$$

$$LL = \left(\sum_{y=0}^{nS-1} p'_Y[-1, y]^2 + \sum_{x=0}^{nS-1} p'_Y[x, -1]^2\right) >> k3 \qquad (10)$$

and where function Clip3(x, y, z) is defined as:

$$Clip3(x, y, z) = \begin{cases} x & ; z < x \\ y & ; z > y \\ z & ; \text{otherwise} \end{cases}$$

In the above pseudo code, after a2s is calculated from equation (17), it is used as an index or key of a look-up table to get a value of 1mDiv, which is then used in equation (18). Table 1 shows a specification of an 1mDiv look-up table, which is listed as Table 8-9 in the work draft JCTVC-G1103_d9. Although 64 a2s entries are listed in Table 1, in practice only 63 a2s entries with values from 1-63 may be used in the computation of LM mode.

TABLE 1

Specification of 1mDiv look-up table in JCTVC-G1103_d9.

| a2s | 1 | 2 | 3 | 4 | 5 | 6 | 7 | 8 | 9 | 10 | 11 | 12 | 13 |
|---|---|---|---|---|---|---|---|---|---|---|---|---|---|
| lmDiv | 32768 | 16384 | 10923 | 8192 | 6554 | 5461 | 4681 | 4096 | 3641 | 3277 | 2979 | 2731 | 2521 |
| a2s | 14 | 15 | 16 | 17 | 18 | 19 | 20 | 21 | 22 | 23 | 24 | 25 | 26 |
| lmDiv | 2341 | 2185 | 2048 | 1928 | 1820 | 1725 | 1638 | 1560 | 1489 | 1425 | 1365 | 1311 | 1260 |
| a2s | 27 | 28 | 29 | 30 | 31 | 32 | 33 | 34 | 35 | 36 | 37 | 38 | 39 |
| lmDiv | 1214 | 1170 | 1130 | 1092 | 1057 | 1024 | 993 | 964 | 936 | 910 | 886 | 862 | 840 |
| a2s | 40 | 41 | 42 | 43 | 44 | 45 | 46 | 47 | 48 | 49 | 50 | 51 | 52 |
| lmDiv | 819 | 799 | 780 | 762 | 745 | 728 | 712 | 697 | 683 | 669 | 655 | 643 | 630 |
| a2s | 53 | 54 | 55 | 56 | 57 | 58 | 59 | 60 | 61 | 62 | 63 | 64 | |
| lmDiv | 618 | 607 | 596 | 585 | 575 | 565 | 555 | 546 | 537 | 529 | 520 | 512 | |

-continued $$LC = \left(\sum_{y=0}^{nS-1} p'_Y[-1, y] * p[-1, y] + \sum_{y=0}^{nS-1} p'_Y[x, -1] * p[x, -1]\right) >> k3 \qquad (11)$$

$$k2 = \log_2((2*nS) >> k3) \qquad (12)$$

Next, more intermediate variables, denoted as a1, a2, k1, a1s, a2s, a3, a, k, and b, are derived using the following pseudo code:

$$a1 = (LC << k2) - L*C \qquad (13)$$

$$a2 = (LL << k2) - L*L \qquad (14)$$

$$k1 = \text{Max}(0, \log_2(\text{abs}(a2)) - 5) - \text{Max}(0, \log_2(\text{abs}(a1)) - 14) + 2 \qquad (15)$$

$$a1s = a1 >> \text{Max}(0, \log_2(\text{abs}(a1)) - 14) \qquad (16)$$

$$a2s = \text{abs}(a2 >> \text{Max}(0, \log_2(\text{abs}(a2)) - 5)) \qquad (17)$$

$$a3 = a2s < 1 ? 0 : \text{Clip3}(-2^{15}, 2^{15} - 1, a1s*1m\,Div\,[a2s] + (1 << (k1-1))) >> k1) \qquad (18)$$

$$a = a3 >> \text{Max}(0, \log_2(\text{abs}(a3)) - 6) \qquad (19)$$

$$k = 13 - \text{Max}(0, \log_2(\text{abs}(\text{alpha})) - 6) \qquad (20)$$

$$b = (C - ((a*L) >> k) + (1 << (k2-1))) >> k2 \qquad (21)$$

Variable a in equation (19) may be a representation of alpha, and variable b in equation (21) may be a representation of beta. After obtaining a, b, and k, predicted chroma samples are computed using equation:

$$predSamples[x,y] = \text{Clip1}_C(((p_Y[x,y]*a) >> k) + b), \text{ with } x,y=0 \ldots nS-1 \qquad (22)$$

where function $\text{Clip1}_C(x)$ is defined as:

$$\text{Clip1}_C(x) = \text{Clip3}(0, (1 << BitDepth_C) - 1, x)$$

Since 1mDiv is a function of variable a2s, each entry of 1mDiv in Table 1 can be calculated using following pseudo code, wherein i=a2s:

UInt 1mDiv [63];
for(Int i=1; i<64; i++)

$$1m\,Div\,[i] = ((1 << 15) + i/2)/i \qquad (23)$$

Although the predicted chroma samples may be generated using the above equations, due to the presence of multipliers with large and varying bit widths during the derivation process (the term "multiplier" may be defined as a variable or quantity by which another variable or quantity is multiplied), the complexity of the algorithm may be quite high. For instance, according to configurations of HEVC test models (HMs), a current chroma block may have size nS in the range 4≤nS≤16, and an input bit depth of the luma and chroma components may be 8 or 10. Suppose, for example, the input bit depth is 8 (bit depth of 10 can be similarly analyzed), then a bit width of the neighboring filtered luma samples ($p_Y[-1, y]$ and $p_Y[x, -1]$) and a bit width of the neighboring reconstructed chroma samples (p[-1, y] and p[x, -1]) are both 8. Since a maximum of nS is 16 (i.e., $2^4$) in HMs, the intermediate variable L calculated in equation (8) may have a maximum of 13 (i.e., 8+4+1) bits. Similarly, the intermediate variable C calculated in equation (9) may also have a maximum of 13 bits.

In equation (10), the calculation of LL uses 2*nS unsigned multipliers (i.e., $p_Y[-1, y]$ and $p_Y[x, -1]$) with a maximum of 8 bits. Thus, LL may have a maximum of 21 (i.e., 2*8+4+1) bits. Similarly, in equation (11), LC may also have a maximum of 21 bits. Then, in equation (13), calculation of a1 involves bit shifting of LC as well as multiplication of L and C. Since multipliers L and C may have a maximum of 13 bits, their product L*C may have a maximum of 26 bits. Thus, equation (13) may have 13-bit multipliers (i.e., L and C) as well as a 26-bit subtractor (i.e., L*C). Similarly, the calculation of a2 in equation (14) may involve a 13-bit multiplier (i.e., L) as well as a 26-bit subtractor (i.e., L*L).

Since k2 may have a maximum value of 5 according to equation (12), a1 and a2 may have a maximum of 26 bits (not including a possible sign bit). Then, a1 is used to calculate a1s, which may have a maximum of 15 bits, and a2 is used to calculate a2s, which is then used as an index of the 1mDiv look-up table to determine 1mDiv. a1s and a2s are then used to calculate a3 in equation (18). In implementation, a3 may be regarded as an integer operated version of a1/a2. In equation (18), both signed multiplier a1s and unsigned multiplier 1mDiv may have a maximum of 15 bits. Due to the large number of bits in multipliers, equation (18) may have the highest computational complexity in LM mode. Overall, it can be seen that the previous LM mode involves different multipliers which vary in bit width. In implementation, multipliers with large and varying bit widths may increase computational complexity.

Disclosed herein are systems and methods for improving intra prediction in the LM mode by introducing a number of new parameters during computation, which may unify a number of bits for multipliers used in computation. A disclosed LM mode may be implemented in a video codec. In the disclosed LM mode, a function (e.g., flooring function) of an average of reconstructed chroma samples located in neighboring blocks of a current chroma block may be computed. In addition, in 4:4:4 sampling, a function of an average of reconstructed luma samples located in neighboring blocks of a corresponding reconstructed luma block may also be computed. Alternatively, in e.g. 4:2:0 sampling, a function of an average of filtered luma samples located in neighboring blocks may be computed. Further, a rounding error caused by flooring of the average values may also be computed. By using these parameters, all multipliers used in computation of the LM mode may have a bit width no greater than an input bit depth of the chroma block. By using a disclosed algorithm, implementation complexity of the LM mode may be reduced.

FIG. 1 illustrates an embodiment of a video encoder 100, in which a disclosed LM mode may be used. The video encoder 100 may comprise a rate-distortion optimization (RDO) module 110, a prediction module 120, a transform module 130, a quantization module 140, an entropy encoder 150, a de-quantization module 160, an inverse transform module 170, and a reconstruction module 180 arranged as shown in FIG. 1. In operation, the video encoder 100 may receive an input video comprising a sequence of video frames (or slices). Herein, a frame may refer to any of a predicted frame (P-frame), an intra-coded frame (I-frame), or a bi-predictive frame (B-frame). Likewise, a slice may refer to any of a P-slice, an I-slice, or a B-slice.

The RDO module 110 may be configured to coordinate or make logic decisions for one or more of other modules. For example, based on one or more previously encoded frames, the RDO module 110 may determine how a current frame (or slice) being encoded is partitioned into a plurality of coding units (CUs), and how a CU is partitioned into one or more prediction units (PUs) and transform units (TUs). CU, PU, and TU are various types of blocks used in HEVC. In addition, the RDO module 110 may determine how the current frame is to be predicted. The current frame may be predicted via inter and/or intra prediction. For intra prediction, there are a plurality of available prediction modes or directions in HEVC (e.g., 34 modes for the Y component and six modes (including LM mode) for the U or V component), and an optimal mode may be determined by the RDO module 110. For example, the RDO module 110 may calculate a sum of absolute error (SAE) for each prediction mode, and select a prediction mode that results in the smallest SAE.

The prediction module 120 may utilize either reference frames for inter prediction or reference pixels in the current frame for intra prediction. In an embodiment, the prediction module 120 is configured to use a disclosed LM mode to generate a prediction block for a current chroma block from the input video. The prediction block comprises a plurality of predicted chroma samples, each of which may be generated based on a first plurality of reconstructed luma samples located in a corresponding reconstructed luma block, a second plurality of reconstructed luma samples located in neighboring blocks of the corresponding reconstructed luma block, and a plurality of reconstructed chroma samples located in neighboring blocks of the chroma block. In an embodiment, generating the plurality of predicted chroma samples includes computing the intermediate variable a2s using e.g., equation (17) described earlier, which is based on the second plurality of reconstructed luma samples. Generating the plurality of predicted chroma samples further includes deriving the intermediate variable 1mDiv from a2s using a look-up table. In an embodiment, the look-up table may comprise less than 63 a2s values.

Upon generation of the prediction block for the current chroma block, the current chroma block may be subtracted by the prediction block, or vice versa, to generate a residual block. The residual block may be fed into the transform module 130, which may convert residual chroma samples into a matrix of transform coefficients. Then, the matrix of transform coefficients may be quantized by the quantization module 140 before being fed into the entropy encoder 150. The quantization module 140 may alter the scale of the transform coefficients and round them to integers, which may reduce the number of non-zero transform coefficients. As a result, a compression ratio may be increased. Quantized transform coefficients may be scanned and encoded by the entropy encoder 150 into an encoded bitstream. Further, to facilitate continuous encoding of chroma blocks, the quantized transform coefficients may also be fed into the de-quantization module 160 to recover the original scale of the transform coefficients. Then, the inverse transform module 170 may perform the inverse of the transform module 130 and generate a noisy version of the original residual block. Then, the lossy residual block may be fed into the reconstruction module 180, which may generate reconstructed luma and/or chroma samples for intra prediction of future chroma blocks. If desired, filtering may be performed on the reconstructed samples before they are used for intra prediction.

It should be noted that FIG. 1 may be a simplified illustration of a video encoder, thus it may include only part of modules present in the video encoder. Other modules (e.g., filter, scanner, and transmitter), although not shown in FIG. 1, may also be included to facilitate video encoding as understood by one of skill in the art. In addition, depending on the encoding scheme, some of the modules in the video encoder may be skipped. For example, in lossless encoding of certain video content, no information loss may be allowed, thus the quantization module 140 and the de-quantization module 160 may be skipped. For another example, if the residual block is encoded directly without being converted to transform coefficients, the transform module 130 and the inverse transform module 170 may be skipped. Moreover, prior to transmission from the encoder, the encoded bitstream may be configured to include other information, such as video resolution, frame rate, block partitioning information (sizes, coordinates), prediction modes, etc., so that the encoded sequence of video frames may be properly decoded by a video decoder.

Figure 2:
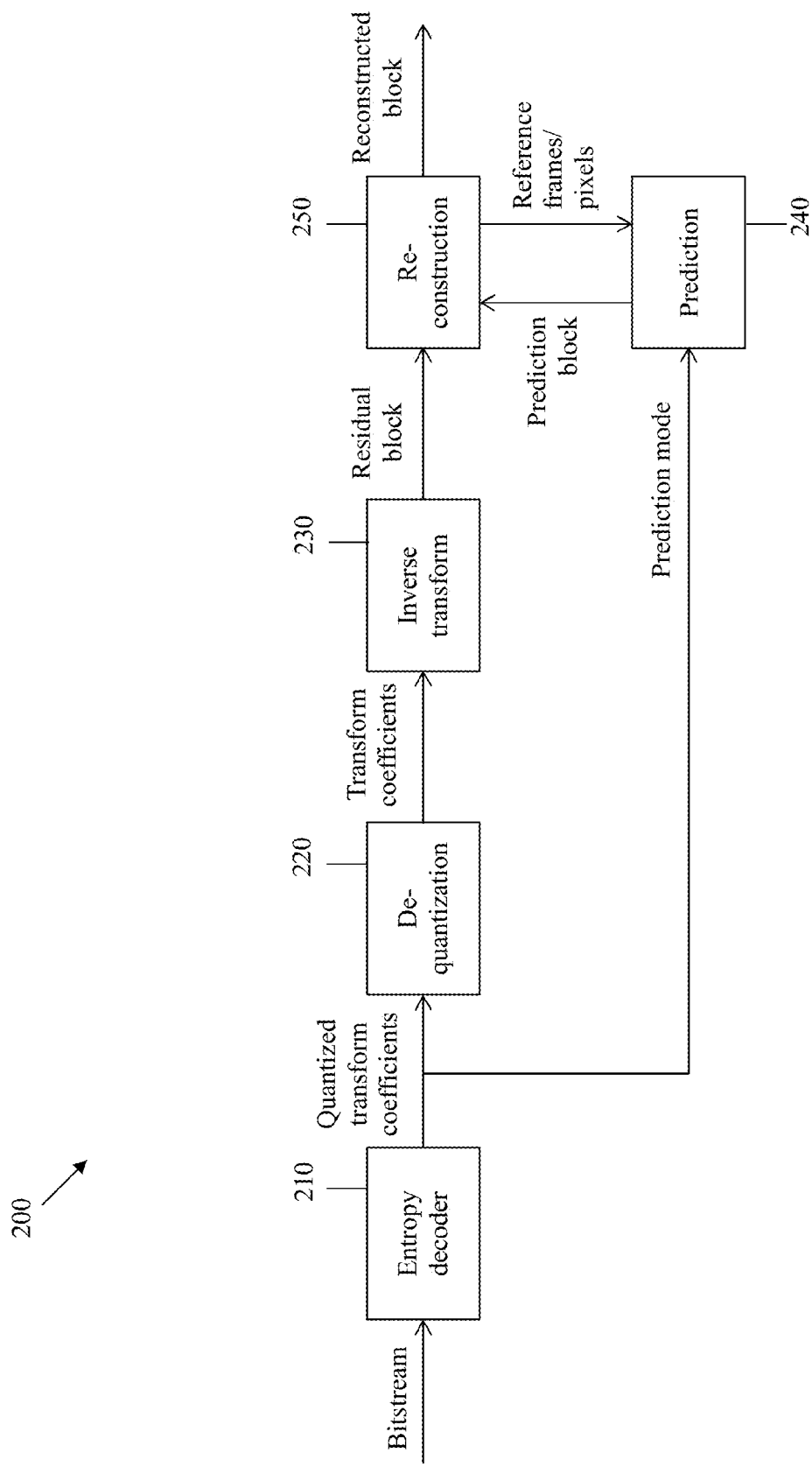
FIG. 2 is a schematic diagram of an embodiment of a video decoding system.

FIG. 2 illustrates an embodiment of a video decoder 200, in which a disclosed LM mode may be used. The video decoder 200 may correspond to the video encoder 100, and may comprise an entropy decoder 210, a de-quantization module 220, an inverse transform module 230, a prediction module 240, and a reconstruction module 250 arranged as shown in FIG. 2. In operation, an encoded bitstream containing information of a sequence of video frames may be received by the entropy decoder 210, which may decode the bitstream to an uncompressed format. A matrix of quantized transform coefficients may be generated, which may then be fed into the de-quantization module 220, which may be the same or similar to the de-quantization module 160 in FIG. 1. Then, output of the de-quantization module 220 may be fed into the inverse transform module 230, which may convert transform coefficients to residual values of a residual block. In addition, information containing a prediction mode (e.g., the LM mode) of the current block may also be decoded by the entropy decoder 210. Based on the prediction mode, the prediction module 240 may generate a prediction block for the current block.

In an embodiment, the prediction module 240 is configured to use a disclosed LM mode to generate a prediction block for a current chroma block. The prediction block comprises a plurality of predicted chroma samples, each of which may be generated based on a first plurality of reconstructed luma samples located in a corresponding reconstructed luma block (already decoded), a second plurality of reconstructed luma samples located in neighboring blocks (already decoded) of the corresponding reconstructed luma block, and a plurality of reconstructed chroma samples located in neighboring blocks (already decoded) of the chroma block. In an embodiment, generating the plurality of predicted chroma samples includes computing the intermediate variable a2s, which is based on the second plurality of reconstructed luma samples. Generating the plurality of predicted chroma samples further includes deriving the intermediate variable 1mDiv from a2s using a look-up table. In an embodiment, the look-up table may comprise less than 63 a2s values.

Upon generation of the prediction block for the current chroma block, the reconstruction module 250 may combine the residual chroma block with the prediction block to generate a reconstructed chroma block. Additionally, to facilitate continuous decoding, some chroma samples of the reconstructed chroma block may also serve as reference pixels for intra prediction of future chroma blocks in the same frame.

In a video codec (e.g., the video encoder 100 or decoder 200), other parameters or intermediate variables are introduced herein to simplify the LM mode used in intra prediction. In an embodiment, a function of an average of filtered luma samples located in neighboring blocks of a corresponding reconstructed luma block and an integer function of an average of reconstructed chroma samples located in neighboring blocks of a chroma block are computed during generation of a prediction block for the chroma block. The function of the average of the filtered luma samples is denoted as avgC, while the function of the average of the reconstructed chroma samples is denoted as avgC. The integer function may be a flooring function, a rounding function, or other suitable functions.

In an embodiment, the two functions are both flooring functions. In this case, avgY' and avgC are computed according to the following equations:

$$avgY' = \text{floor}\left(\frac{\sum_{y=0}^{nS-1} p'_Y[-1, y] + \sum_{x=0}^{nS-1} p'_Y[x, -1]}{2*nS}\right) \quad (24)$$

$$= \left(\sum_{y=0}^{nS-1} p'_Y[-1, y] + \sum_{x=0}^{nS-1} p'_Y[x, -1]\right) >> (\log_2(2*nS))$$

$$avgC = \text{floor}\left(\frac{\sum_{y=0}^{nS-1} p[-1, y] + \sum_{x=0}^{nS-1} p[x, -1]}{2*nS}\right) \quad (25)$$

$$= \left(\sum_{y=0}^{nS-1} p[-1, y] + \sum_{x=0}^{nS-1} p[x, -1]\right) >> (\log_2(2*nS))$$

It can be seen that avgY' has a maximum bit width that is the same with an input bit depth of the luma component. For example, if the input bit depth is 8, avgY' may have a maximum of 8 bits. If the input bit depth is 10, avgY' may have a maximum of 10 bits. Similar to avgY', the floored average value avgC also has a maximum bit width equal to or identical with an input bit depth of the chroma component (U or V).

In an embodiment, two additional parameters or intermediate variables, denoted as RErrY' and RErrC may be computed in a LM mode. RErrY' may indicate a difference between the average of the second plurality of filtered luma samples and avgY', and RErrC may indicate a difference between the average of the plurality of reconstructed chroma samples and avgC. The differences may also be referred as rounding errors, since they may be caused by flooring of the average values. RErrY' and RErrC may be computed using the following equations (in the equations, "&" represents the logical "AND" operator):

$$RErrY' = \left(\sum_{y=0}^{nS-1} p'_Y[-1, y] + \sum_{x=0}^{nS-1} p'_Y[x, -1]\right) - \quad (26)$$

$$(avgY' << \log_2(2*nS))$$

$$= \left(\sum_{y=0}^{nS-1} p'_Y[-1, y] + \sum_{x=0}^{nS-1} p'_Y[x, -1]\right) \&$$

$$((1 << \log_2(2*nS)) - 1)$$

$$RErrC = \left(\sum_{y=0}^{nS-1} p[-1, y] + \sum_{x=0}^{nS-1} p[x, -1]\right) - \quad (27)$$

$$(avgC << \log_2(2*nS))$$

$$= \left(\sum_{y=0}^{nS-1} p[-1, y] + \sum_{x=0}^{nS-1} p[x, -1]\right) \&$$

$$((1 << \log_2(2*nS)) - 1)$$

From equation (26), it can be seen that the rounding error RErrY' is a non-negative integer. A mathematical proof is given as:

$$\therefore avgY' = \text{floor}\left(\frac{\sum_{y=0}^{nS-1} p'_Y[-1, y] + \sum_{x=0}^{nS-1} p'_Y[x, -1]}{2*nS}\right) \leq$$

-continued $$\frac{\sum_{y=0}^{nS-1} p'_Y[-1, y] + \sum_{x=0}^{nS-1} p'_Y[x, -1]}{2*nS}$$

$$\therefore (avgY' << \log_2(2*nS)) \le \left( \sum_{y=0}^{nS-1} p'_Y[-1, y] + \sum_{x=0}^{nS-1} p'_Y[x, -1] \right)$$

$$\therefore RErrY' = \sum_{y=0}^{nS-1} p'_Y[-1, y] + \sum_{x=0}^{nS-1} p'_Y[x, -1]) - (avgY' << \log_2(2*nS) \ge 0$$

Further, it can be seen that RErrY' has a maximum bit width that is the same with $\log_2(2*nS)$. For example, if nS is 16, which may be the largest value allowed in HEVC, RErrY' may have a maximum of 5 bits. Similar to RErrY', it can be seen that the rounding error RErrC is also a non-negative integer and has a maximum bit width equal to $\log_2(2*nS)$ (U or V).

With the introduction of intermediate variables RErrY' and RErrC, the algorithm complexity of a disclosed LM mode may be lowered. Compared to the original algorithm as shown in equations (1) to (19), calculations of some intermediate variables are simplified, which will be shown mathematically below. For example, the intermediate variable a1 may now be calculated as follows:

$$a1 = (LC << k2) - L*C \qquad (28)$$

$$= \frac{\left( \sum_{y=0}^{nS-1} p'_Y[-1, y] * p[-1, y] + \sum_{y=0}^{nS-1} p'_Y[x, -1] * p[x, -1] \right) * 2^{k2}}{2^{k3}} -$$

$$\frac{\left( \sum_{y=0}^{nS-1} p'_Y[-1, y] + \sum_{x=0}^{nS-1} p'_Y[x, -1] \right)}{2^{k3}} *$$

$$\frac{\left( \sum_{y=0}^{nS-1} p[-1, y] + \sum_{x=0}^{nS-1} p[x, -1] \right)}{2^{k3}}$$

$$= \frac{2*nS * \left( \sum_{y=0}^{nS-1} p'_Y[-1, y] * p[-1, y] + \sum_{y=0}^{nS-1} p'_Y[x, -1] * p[x, -1] \right)}{2^{2*k3}} -$$

$$\frac{(2*nS*avgY' + RErrY') * (2*nS*avgC + RErrC)}{2^{2*k3}}$$

$$= \frac{2*nS * \left( \sum_{y=0}^{nS-1} p'_Y[-1, y] * p[-1, y] + \sum_{y=0}^{nS-1} p'_Y[x, -1] * p[x, -1] \right)}{2^{2*k3}} -$$

$$\frac{2*nS*(2*nS*avgY'*avgC + avgY'*RErrC + RErrY'*avgC) + RErrY'*RErrC}{2^{2*k3}}$$

Ignoring the multiplication of rounding error RErrY'*RErrC which may be a relatively small value, a1 is replaced by a1':

$$a1' = \frac{2*nS*(LC-(2*nS*avgY'*avgC+avgY'*RErrC+RErrY'*avgC))}{2^{2*k3}} \quad (29)$$

In equation (29), it can be seen that unsigned multipliers including avgY', avgC, RErrY', and RErrC have a maximum bit width equal to or less than an input bit depth of the luma and chroma components. For example, if the input bit depth (e.g., $BitDepth_C$) is 8, only multipliers with a maximum of 8 bits are needed for the calculation of a1'. If input bit depth is 10, only multipliers with a maximum of 10 bits are needed for the calculation of a1'. Compared with the original algorithm which uses larger multipliers L and C to calculate a1, computation complexity in calculation of a1' may be made relatively lower.

Similarly, the intermediate variable a2 may now be calculated as follows:

$$a2 = (LL << k2) - L*L \quad (30)$$

$$= \frac{\left(\sum_{y=0}^{nS-1} p'_Y[-1,y]^2 + \sum_{x=0}^{nS-1} p'_Y[x,-1]^2\right)*2^{k2}}{2^{k3}} -$$

$$\frac{\left(\sum_{y=0}^{nS-1} p'_Y[-1,y] + \sum_{x=0}^{nS-1} p'_Y[x,-1]\right)^2}{2^{2*k3}}$$

$$= \frac{\left(\sum_{y=0}^{nS-1} p'_Y[-1,y]^2 + \sum_{x=0}^{nS-1} p'_Y[x,-1]^2\right)*2^{k2+k3} -}{2^{2*k3}} -$$

$$\frac{(2*nS*avgY' + RErrY')^2}{2^{2*k3}}$$

$$2*nS*\left(\sum_{y=0}^{nS-1} p'_Y[-1,y]^2 + \sum_{x=0}^{nS-1} p'_Y[x,-1]^2\right) -$$

$$= \frac{4*nS^2*avgY'^2 - 4*nS*avgY'*RErrY' - RErrY'^2}{2^{2*k3}}$$

Ignoring the multiplication of rounding error RErrY'*RErrC, which is a relatively small value, a2 is replaced by a2':

$$a2' = \frac{2*nS*(LL-(2*nS*avgY'^2 + 2*avgY'*RErrY'))}{2^{2*k3}} \quad (31)$$

In equation (31), it can be seen that unsigned multipliers avgY' and RErrY' have a maximum bit width equal to an input bit depth of the luma and chroma components. For example, if the input bit depth (e.g., $BitDepth_C$) is 8, only multipliers with a maximum of 8 bits are needed for the calculation of a2'. If input bit depth is 10, only multipliers with a maximum of 10 bits are needed for the calculation of a2'. Compared with the original algorithm which uses larger multiplier L to calculate a2, computation complexity in calculation of a2' may be made relatively lower.

Alpha in equation (4) may be replaced by alpha', which may be calculated from a1' and a2' using equation:

$$\text{alpha}' = \frac{a1'}{a2'} \quad (32)$$

$$= \frac{LC-(2*nS*avgY'*avgC+avgY'*RErrC+RErrY'*avgC)}{LL-(2*nS*avgY'^2 + 2*avgY'*RErrY')}$$

Equation (32) indicates that unsigned multipliers avgY', avgC, RErrY', and RErrC all have a maximum bit width equal to an input bit depth of the luma and chroma components. If the input bit depth is 8, no multiplier more than 8-bit is needed to calculate alpha'.

One skilled in the art will recognize that in a division operation such as equation (32), common terms in the numerator and denominator will cancel out. Thus, alternative definitions of a1' and a2' may also be used, for example, as follows:

a1'=LC-(2*nS*avgY'*avgC+avgY'*RErrC+RErrY'*avgC)

a2'=LL-(2*nS*avgY'^2+2*avgY'*RErrY')

In implementation, division operation may be converted to integer operations such as bit shifting, thus alpha' may be calculated via the following pseudo code, which can replace equations (15)-(18):

$$k1 = \text{Max}(0, \log_2(\text{abs}(a1'))-BitDepth_C+1) \quad (33)$$

$$k2 = \text{Max}(0, \log_2(\text{abs}(a2'))-6) \quad (34)$$

$$k3 = k2-k1+BitDepth_C-13 \quad (35)$$

$$a1s = a1' >> k1 \quad (36)$$

$$a2s = a2' >> k2 \quad (37)$$

$$a2t = a2s<1?0:(1m \text{ Div } [a2s]+(1<<(15-BitDepth_C-1)))>>(15-BitDepth_C)) \quad (38)$$

$$a2t = \text{Clip1}_C(a2t) \quad (39)$$

$$a3 = \text{Clip3}(-2^{15},2^{15}-1,(k3>0?(a1s*a2t)>>k3:(a1s*a2t)<<(-k3))) \quad (40)$$

In equation (40), two multipliers a1s and a2t are used. Equation (36) indicates that the values of a1s may be restrained in the range of $(-(1<<(BitDepth_C-1)), (1<<(BitDepth_C-1))-1)$. For example, if $BitDepth_C=8$, the range is (−128, 127). If $BitDepth_C=10$, the range is (−512,511). Similarly, equations (38) and (39) indicates that the values of a2t may be restrained in the range of $(0,(1<<BitDepth_C)-1)$. For example, if $BitDepth_C=8$, the range is (0, 255). If $BitDepth_C=10$, the range is (0,1023). Thus, it can be seen that both multipliers a1s and a2t are aligned with the input bit depth.

Similar to alpha, using the parameters of avgY', RErrY', avgC, and RErrC, the original calculation of beta in equation (5) can be rewritten as:

$$\text{beta} = \frac{2*nS*avgC + RErrC - \text{alpha}*(2*nS*avgY' + RErrY')}{2*nS} \quad (41)$$

In equation (41), since the rounding errors RErrC and RErrY' may typically be much smaller than 2*nS*avgC and 2*nS*avgC, respectively, the two rounding errors may be ignored from the numerator. Thus, in equation (41), alpha is replaced by alpha' and beta is replaced by beta', which is computed as:

$$\text{beta}' = \frac{2*nS*avgC - \text{alpha}'*2*nS*avgY'}{2*nS} \quad (42)$$
$$= avgC - \text{alpha}'*avgY'$$

In equation (42), unsigned multipliers alpha' and avgY' both have a maximum bit width equal to an input bit depth of the luma and chroma components. For example, if the input bit depth (e.g., BitDepth$_C$) is 8, only multipliers with a maximum of 8 bits are needed for the calculation of beta'. If input bit depth is 10, only multipliers with a maximum of 10 bits are needed for the calculation of beta'. Compared with the original algorithm which uses larger multiplier L to calculate beta in equation (21), computation complexity in calculation of beta' may be made relatively lower. Further, no bit shifting is needed anymore to calculate beta'.

From the above description, it can be seen that by introducing parameters avgY', RErrY', avgC, and RErrC, and unify the bit widths of a1s and a2t, calculation of both alpha' and beta' involve multipliers that have a bit width no greater than an input depth of the luma and chroma components. That is, alpha' and beta' do not require any multipliers with a bit width greater than an input bit depth of the luma and chroma components. In particular, some color-related multipliers (including avgY', avgC, alpha', and beta') may have a bit width equal to the input depth.

The original algorithm shown in equations (1)-(3) and (7)-(22) can be modified to incorporate the newly introduced parameters. In an embodiment, predicted chroma samples (i.e., predSamples[x, y]) may be generated using filtered luma samples and reconstructed chroma samples via the following equations and/or pseudo code, wherein the 1mDiv value is looked up from a 63-entry look-up table (e.g., Table 1):

$p_{Y'}[x,-1]=(\text{recSamples}_L[2x-1,-1]+2*\text{recSamples}_L[2x,-1]+\text{recSamples}_L[2x+1,-1]+2)>>2$, with $x=0 \ldots nS-1$ $p_{Y'}[-1,y]=(\text{recSamples}_L[-1,2y]+\text{recSamples}_L[-1,2y+1])>>1$, with $y=0 \ldots nS-1$ $p_{Y'}[x,y]=(\text{recSamples}_L[2x,2y]+\text{recSamples}_L[2x,2y+1])>>1$, with $x,y=0 \ldots nS-1$ $$L = \sum_{y=0}^{nS-1} p'_Y[-1,y] + \sum_{x=0}^{nS-1} p'_Y[x,-1]$$

$$C = \sum_{y=0}^{nS-1} p[-1,y] + \sum_{x=0}^{nS-1} p[x,-1]$$

$$LL = \sum_{y=0}^{nS-1} p'_Y[-1,y]^2 + \sum_{x=0}^{nS-1} p'_Y[x,-1]^2$$

$$LC = \sum_{y=0}^{nS-1} p'_Y[-1,y]*p[-1,y] + \sum_{x=0}^{nS-1} p'_Y[x,-1]*p[x,-1]$$

$k0=\text{Log }2((2*nS))$ $avgY'=L>>k0$ $RErrY'=L\&((1<<k0)-1)$ $avgC=C>>k0$ $RErrC=C\&((1<<k0)-1)$ $a1=LC-(2*nS*avgY'*avgC+avgY'*RErrC+avgC*RErrY')$ $a2=LL-(2*nS*avgY'^2+2*avgY'*RErrY')$ $k1=\text{Max}(0,\log_2(\text{abs}(a1))-\text{BitDepth}_C+2)$ $k2=\text{Max}(0,\log_2(\text{abs}(a2))-5)$ $k3=k2-k1+\text{BitDepth}_C-13$ $a1s=a1>>k1$ $a2s=a2>>k2$ $a2t=a2s<1?0:(1m\text{ Div }[a2s]+(1<<(15-\text{BitDepth}_C-1)))>>(15-\text{BitDepth}_C))$ \quad (43)

$a2t=\text{Clip1}_C(a2t)$ $a3=\text{Clip3}(-2^{15},2^{15}-1,(k3>0?(a1s*a2t)>>k3:(a1s*a2t)<<(-k3)))$ $k4=\log_2(a3<0?\text{abs}(a3)-1:\text{abs}(a3))-6$ $a=(a3>=-2^6\&\&a3<=2^6-1)?a3:(a3>>k4)$ $k=13-((a3>=-2^6\&\&a3<=2^6-1)?0:k4)$ $b=avgC-((a*avgY')>>k)$ \quad (44)

predSamples$[x,y]=\text{Clip1}_C(((p_{Y'}[x,y]*a)>>k)+b)$, with $x,y=0 \ldots nS-1$ \quad (45)

In the above equations and/or pseudo code, all multipliers are non-negative integers and have a maximum bit width no greater than an input depth of the luma and chroma components. For example, if the input bit depth (e.g., BitDepth$_C$) is 8, some of the color-related multipliers (including avgY', avgC, alpha', and beta') may have a maximum of 8 bits. If input bit depth is 10, these color-related multipliers may have a maximum of 10 bits. With the uniform bit width, computation complexity of the disclosed LM may be simplified compared to the original algorithm.

It should be noted that algorithms disclosed herein may not depend on the number of entries in a 1mDiv look-up table. Thus, although a 63-entry look-up table may be used in the above pseudo code to determine 1mDiv, the look-up table may have less than 63 entries (e.g., 32 entries). In addition, 1mDiv may be determined via an equation instead of a look-up table. In an embodiment, a 1mDiv look-up table comprising 32 entries may be used, in which case the equation (43) above may be replaced by the following equation or its equivalent, while leaving other equations intact:

$a2t=a2s<32?0:(1m\text{ Div }[a2s]+(1<<(15-\text{BitDepth}_C-1)))>>(15-\text{BitDepth}_C))$ The equations, code, and/or pseudo code described herein may be implemented using any suitable coding or programming language, such as C/C++; Java, Perl, Python, Matlab, verilog, very-high-speed integrated circuits hardware description language (VHDL), any other language, or any combination thereof. Further, intermediate variables used herein may or may not have a corresponding physical quantity. Notations of variables can be changed without departing from principles of the present disclosure. In implementation, if a second variable does not depend on a first variable, then the second variable may be computed before or after the first variable. Otherwise, if the second variable depends on the first variable, then the second variable is computed after the first variable. Moreover, there may be various approaches to generate prediction chroma samples, which may use same or different intermediate variables and algorithms. For example, part of the pseudo code may be changed to use an equation in determining an 1mDiv value instead of using a look-up table (e.g., Table 3).

While a YUV sampling rate of 4:2:0, as described above, may require filtering of reconstructed luma samples before using them as reference samples, other sampling rates may require no filtering or subsampling, or may have different filtering schemes. For example, in 4:4:4 sampling, each reconstructed luma sample may be used directly as reference samples, without any further filtering or downsampling. In this case, a current chroma block and its corresponding luma block have a same size of nS×nS (or 2nS×2nS if desired). Further, $p_Y[x, y] = recSamples_L[x, y]$ with $x, y = -1 \ldots nS-1$. Alternatively, since no filtering is needed anymore, notation $p_Y[x, y]$ may simply be skipped, and reconstructed luma samples (i.e., $recSamples_L[x, y]$) are used in following computations. In an embodiment, a function of an average of reconstructed luma samples located in neighboring blocks of the corresponding reconstructed luma block may be computed as:

$$avgY' = \text{floor}\left(\frac{\sum_{y=0}^{nS-1} recSamples_L[-1, y] + \sum_{x=0}^{nS-1} recSamples_L[x, -1]}{2*nS}\right)$$

In an embodiment of LM mode with 4:4:4 coded blocks, predicted chroma samples may be generated using reconstructed luma and chroma samples via the following equations and/or pseudo code:

$k0 = \text{Max}(0, \text{BitDepth}_C + \text{Log } 2(nS) - 14)$ $$L = \left(\sum_{y=0}^{nS-1} recSamples_L[-1, y] + \sum_{x=0}^{nS-1} recSamples_L[x, -1]\right) >> k0$$

$$C = \left(\sum_{y=0}^{nS-1} p[-1, y] + \sum_{x=0}^{nS-1} p[x, -1]\right) >> k0$$

$$LL = \left(\sum_{y=0}^{nS-1} recSamples_L[-1, y]^2 + \sum_{x=0}^{nS-1} recSamples_L[x, -1]^2\right) >> k0$$

$$LC = \left(\sum_{y=0}^{nS-1} recSamples_L[-1, y] * p[-1, y] + \sum_{y=0}^{nS-1} recSamples_L[x, -1] * p[x, -1]\right) >> k0$$

$k1 = \text{Log } 2((2*nS) >> k0)$ $avgY' = L >> k1$ $RErrY' = L \& ((1 << k1) - 1)$ $avgC = C >> k1$ $RErrC = C \& ((1 << k1) - 1)$ $a1 = LC - (2*nS*avgY'*avgC + avgY'*RErrC + avgC*RErrY')$ $a2 = LL - (2*nS*avgY'^2 + 2*avgY'*RErrY')$ $k2 = (a1 == 0)?0:\text{Max}(0,\text{Floor}(\text{Log } 2(\text{Abs}(a1))) - \text{BitDepth}_C + 2)$ $k3 = (a2 == 0)?0:\text{Max}(0,\text{Floor}(\text{Log } 2(\text{Abs}(a2))) - 5)$ $k4 = k3 - k2 + \text{BitDepth}_C - 2$ $a1s = a1 >> k2$ $a2s = a2 >> k3$ $1m \text{ Div} = (1 << (\text{BitDepth}_C + 4) + a2s/2)/a2s$ $a2t = (a2s < 32)?0:1m \text{ Div}$ $a2t = \text{Clip1}_C(a2t)$ $\text{if}(a2s < 32)$ $a3 = 0$ else if $(a2s >= 32 \&\& k4 >= 0)$ $a3 = (a1s*a2t) >> k4$ else $a3 = (a1s*a2t) << (-k4)$ $a4 = \text{Clip3}(-2^8, 2^8-1, a3)$ $a5 = a4 << 7$ $k5 = (a5 == 0)?0:k5 = \text{Floor}(\text{Log } 2(\text{Abs}(a5) + \text{Sign2}(a5) - 1)/2)) - 5$ $k = 13 - k5$ $a = a5 >> k5$ $b = avgC - ((a*avgY') >> k)$ $predSamples[x,y] = \text{Clip1}_C(((p_Y[x,y]*a) >> k) + b)$, with $x, y = 0 \ldots nS-1$ It should be noted that, in implementation, part of the equations and/or pseudo code may be changed without departing from principles of the present disclosure. For example, in generating a predicted chroma sample, instead of using an equation, a value of 1mDiv may be determined via a look-up table described above.

Figure 3:
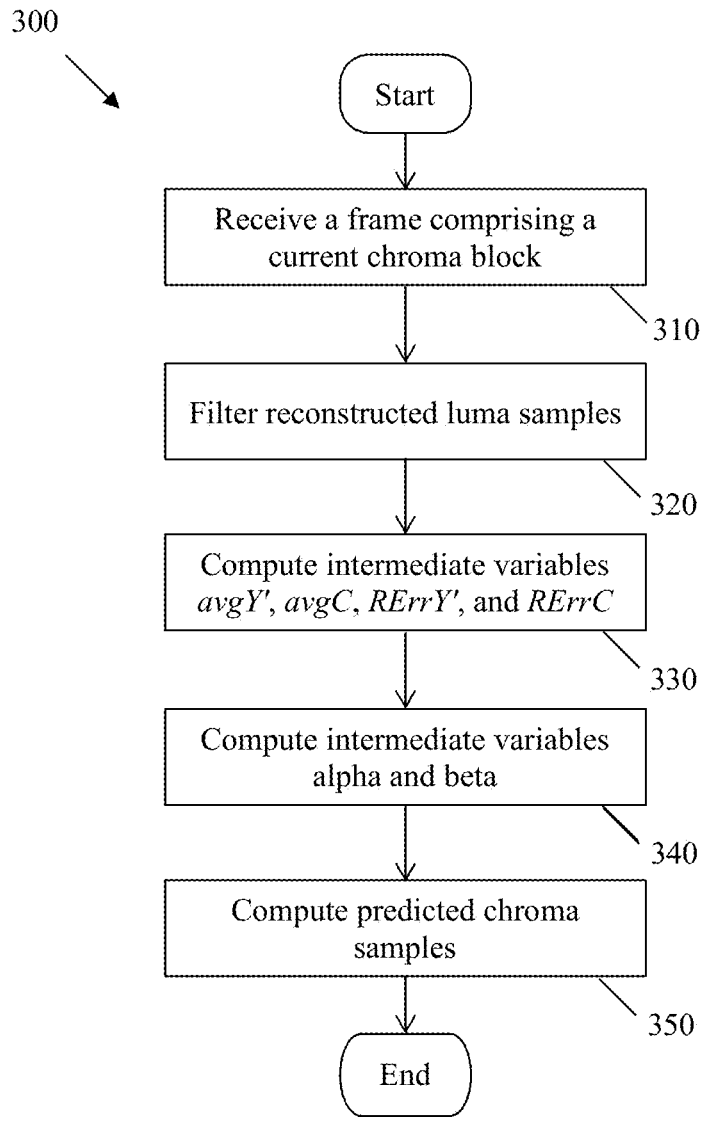
FIG. 3 is a flowchart of an embodiment of an intra prediction method in a disclosed linear method (LM) mode.

FIG. 3 is a flowchart of an intra prediction method 300 using a disclosed LM mode. The method 300 may be implemented in a video codec (e.g., the video encoder 100 in FIG. 1). The method 300 starts in step 310, where a video frame or slice comprising a current chroma block may be received. The video frame may also comprise already-coded blocks including a reconstructed luma block corresponding to the current chroma block, reconstructed luma samples neighboring the corresponding luma block, and reconstructed chroma sample neighboring the current chroma block. The corresponding luma block comprises a plurality of reconstructed luma samples.

Next, in step 320, the reconstructed luma samples may be filtered or downsampled to generate filtered luma samples, which will then be used as reference samples. After filtering, a width of the corresponding reconstructed luma block may be reduced to half, which equals a width of the current chroma block. Filtering or downsampling of the luma component may be needed in, e.g., a sampling rate of 4:2:0. In other sampling rates, such as 4:4:4, reconstructed luma samples may be directly used as reference samples without any filtering or downsampling. In this case, step 320 may be skipped.

Next, in step 330, intermediate variables including avgY', avgC, RErrY', and RErrC may be computed based on the filtered luma samples as well as reconstructed chroma samples. The intermediate variables may be computed using equations and/or pseudo code presented herein. Next, in step 340, intermediate variables including alpha (sometimes denoted as a) and beta (sometimes denoted as b) may be computed based on previously computed intermediate variables. Computation of alpha and beta may include determining of 1mDiv value, which may be based on an 1mDiv look-up table or an equation.

Next, in step 350, predicted chroma samples may be computed based on computed alpha and beta values, which serve as linear coefficients applied onto the filtered luma samples located in the corresponding luma block. The predicted chroma samples make up the prediction block of the current chroma block. It should be understood that the method 300 may include only a portion of intermediate variables needed to complete the LM mode, thus other intermediate variables, such as k, k1, k2, k3, etc., may also be incorporated into the intra prediction process wherever appropriate. Notations of intermediate variables may be changed without departing from principles of the disclosed LM mode.

In use, intra prediction in the LM mode using disclosed uniform multipliers can be tested and compared with HEVC test model (HM) anchors. To evaluate coding performance after unifying bit width of multipliers, simulations were tested under All Intra High Efficiency (HE) and All Intra Main configurations. Testing results included the average percentage Bjontegaard Delta (BD) rates on a plurality of resolution classes (Classes A, B, C, D, E, and F) for the three components of color space (Y, U, and V), as well as encryption (Enc) and decryption (Dec) times. In the simulations, the BD rates of intra prediction using the disclosed LM mode were compared with the LM mode used in a HM 6.0 anchor of an encoder, which uses multipliers varying in bit width.

Table 2 shows relative performance of intra prediction using a disclosed algorithm in comparison to the HM 6.0 anchor in All Intra HE configuration. Results suggested that the average BD rates of the test case showed no change or small increases. For example, the average BD rate of A, B, C, D, and E classes remained the same for the U component and increased by 0.1% for the V component in All Intra HE. The BD rate of F class increased by 0.2% for the U component and by 0.4% for the V component. Further, in comparison to the HM 6.0 anchor, the encoding (Enc) and decoding (Dec) times of the test case remained the same.

TABLE 2

Testing result of disclosed algorithm vs. HM 6.0 anchor All Intra HE.

| | All Intra HE | | |
|---|---|---|---|
| | Y | U | V |
| Class A | 0.0% | 0.1% | 0.2% |
| Class B | 0.0% | 0.0% | 0.0% |
| Class C | 0.0% | 0.0% | 0.1% |
| Class D | 0.0% | 0.0% | 0.0% |
| Class E | 0.0% | 0.0% | 0.0% |
| Overall | 0.0% | 0.0% | 0.1% |
| | 0.0% | 0.0% | 0.1% |
| Class F | 0.0% | 0.2% | 0.4% |
| Enc Time [%] | | 100% | |
| Dec Time [%] | | 100% | |

Table 3 shows relative performance of intra prediction using a disclosed algorithm in comparison to the HM 6.0 anchor in All Intra Main configuration. Results suggested that the average BD rates of chroma components showed small increases. For example, the average BD rate of A, B, C, D, and E classes increased by 0.3% for the U component and by 0.1% for the V component. The BD rate of F class increased by 0.2% for the U component and by 0.4% for the V component. Further, in comparison to the HM 6.0 anchor, the encoding (Enc) and decoding (Dec) times of the test case remained the same.

TABLE 3

Testing result of disclosed algorithm vs. HM 6.0 anchor All Intra Main.

| | All Intra Main | | |
|---|---|---|---|
| | Y | U | V |
| Class A | 0.0% | 1.0% | 0.7% |
| Class B | 0.0% | 0.3% | 0.0% |
| Class C | 0.0% | 0.1% | 0.1% |
| Class D | 0.0% | 0.0% | 0.0% |
| Class E | 0.0% | 0.0% | −0.1% |
| Overall | 0.0% | 0.3% | 0.1% |
| | 0.0% | 0.3% | 0.1% |
| Class F | 0.0% | 0.2% | 0.4% |
| Enc Time [%] | | 100% | |
| Dec Time [%] | | 100% | |

Figure 4A:
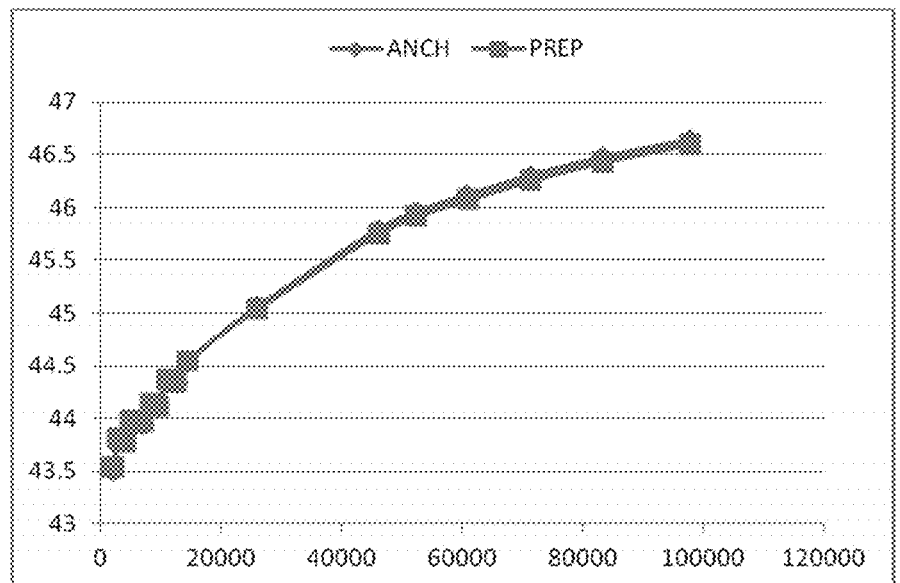
FIGS. 4A and 4B show rate distortion (RD) curves of a disclosed algorithm versus an high efficiency video coding (HEVC) test model (HM) 6.0 anchor.
Figure 4B:
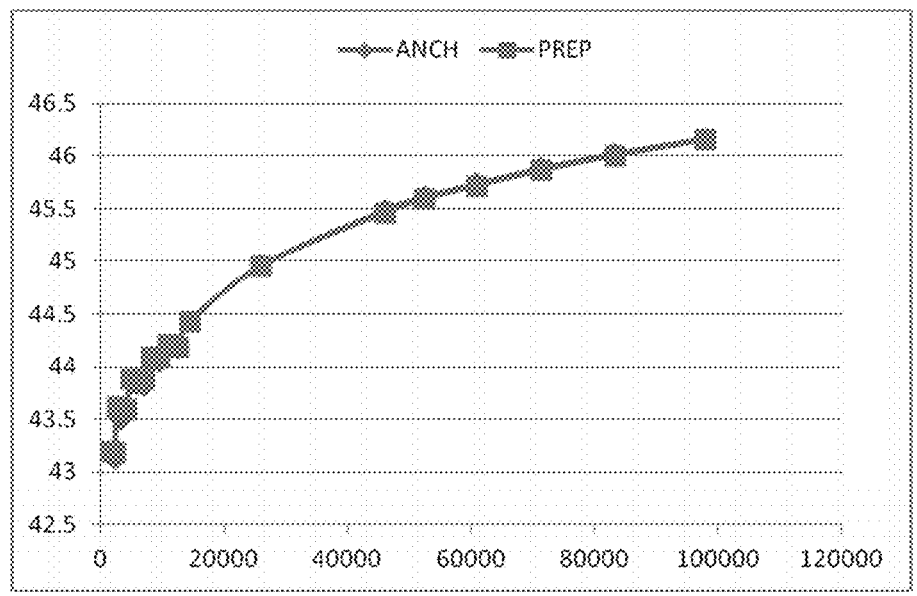

Comparing Table 3 with Table 2, it can be seen that the BD-rate increase for Class A is greater in All Intra Main than in All Intra HE. Among video sequences testing for Class A, the largest BD-rate increase came from the sequence of SteamLocomotive, which revealed increases of Y: 0.0%, U: 2.58%, and V: 2.42% respectively. Thus, for a more complete evaluation, additional quantization parameter (QP) values were simulated to further compare the performances. FIG. 4A shows rate distortion (RD) curves of the disclosed algorithm versus the HM 6.0 anchor All Intra Main for the SteamLocomotive sequence in the U component. The horizontal axis indicates bitrate and the vertical axis indicates peak signal-to-noise ratio (PSNR). "ANCH" denotes anchor and "PREP" denotes the proposed method. Similarly, FIG. 4B shows RD curves of the disclosed algorithm versus the HM 6.0 anchor All Intra Main for the SteamLocomotive sequence in the V component. FIGS. 4A and 4B suggested that the disclosed algorithm had almost identical performances compared to the HM 6.0 anchor in the chroma components.

In simulation tests, it was found that, in the common testing condition, luma peak signal-to-noise ratio (PSNR)

values of the SteamLocomotive sequence for QP values {22, 27, 32, 37} tested in Table 3 were relatively higher than Y-PSNR values of other sequences under same QP values. It indicated that these QP values may not have been optimal choices to compare performances of the disclosed algorithm and the HM 6.0 anchor. Thus, average Y-PSNR values of a dedicated QP were calculated for all video sequences except the SteamLocomotive and Nebuta sequences. Values of {42.34 dB, 39.06 dB, 36.07 dB, 33.13 dB} were obtained. Accordingly, QP values of {25, 34, 42, 48} were chosen for the SteamLocomotive sequence as the corresponding Y-PSNR values of the chosen QP values were close to average values of all video sequences. Table 4 shows relative performance of intra prediction using the disclosed algorithm in comparison to the HM 6.0 anchor in All Intra Main configuration using QP values of {25, 34, 42, 48}. Results suggested that the average BD rates decreased for all YUV components. For example, the average BD rate decreased by 0.1% for the Y component, by 0.9% for the U component, and by 3.1% for the V component.

TABLE 4

Testing results of disclosed algorithm vs. HM 6.0 anchor All Intra Main using a group of QPs.

| QP | HM 6.0 Anchor [__] | | | | Disclosed method [__] | | | | Y | U | V | Y | U | V |
|---|---|---|---|---|---|---|---|---|---|---|---|---|---|---|
| 25 | 60825.44 | 42.09 | 46.12 | 45.74 | 60858.82 | 42.09 | 46.07 | 45.71 | −0.1% | −0.9% | −3.1% | −0.1% | −0.5% | −3.0% |
| 34 | 20753.13 | 39.13 | 44.89 | 44.79 | 20743.68 | 39.13 | 44.88 | 44.78 | | | | | | |
| 42 | 6999.92 | 36.03 | 43.94 | 43.81 | 6996.92 | 36.03 | 43.97 | 43.88 | | | | | | |
| 48 | 2203.28 | 33.36 | 43.51 | 43.12 | 2201.61 | 33.35 | 43.54 | 43.18 | | | | | | |

Since performances of the 10-bit sequences varied in the All Intra Main configuration, further testing was conducted without the two 10-bit sequences of Class A. Thus, only 8-bit sequences were included in the testing. Table 5 shows relative performance of intra prediction using a disclosed algorithm in comparison to the HM 6.0 anchor in All Intra Main configuration. Results suggested that the average BD rates of chroma components showed no change or small increase. For example, the average BD rate of A, B, C, D, and E classes increased by 0.1% for the U component and remained the same for the V component. The BD rate of F class increased by 0.2% for the U component and by 0.4% for the V component. Further, in comparison to the HM 6.0 anchor, the encoding (Enc) and decoding (Dec) times of the test case remained the same. After removing the 10-bit sequences from Class A in All Intra Main, it can be seen that testing results becomes comparable with results of the in All Intra HE configuration shown in Table 2.

TABLE 5

Testing result of disclosed algorithm vs. HM 6.0 anchor without 10-bit sequences of Class A.

| | All Intra Main | | |
|---|---|---|---|
| | Y | U | V |
| Class A (8-b) | 0.0% | 0.1% | 0.1% |
| Class B | 0.0% | 0.3% | 0.0% |
| Class C | 0.0% | 0.1% | 0.1% |
| Class D | 0.0% | 0.0% | 0.0% |
| Class E | 0.0% | 0.0% | −0.1% |
| Overall | 0.0% | 0.1% | 0.0% |
| | 0.0% | 0.2% | 0.0% |

TABLE 5-continued

Testing result of disclosed algorithm vs. HM 6.0 anchor without 10-bit sequences of Class A.

| | All Intra Main | | |
|---|---|---|---|
| | Y | U | V |
| Class F | 0.0% | 0.2% | 0.4% |
| Enc Time[%] | | 100% | |
| Dec Time[%] | | 100% | |

Figure 5:
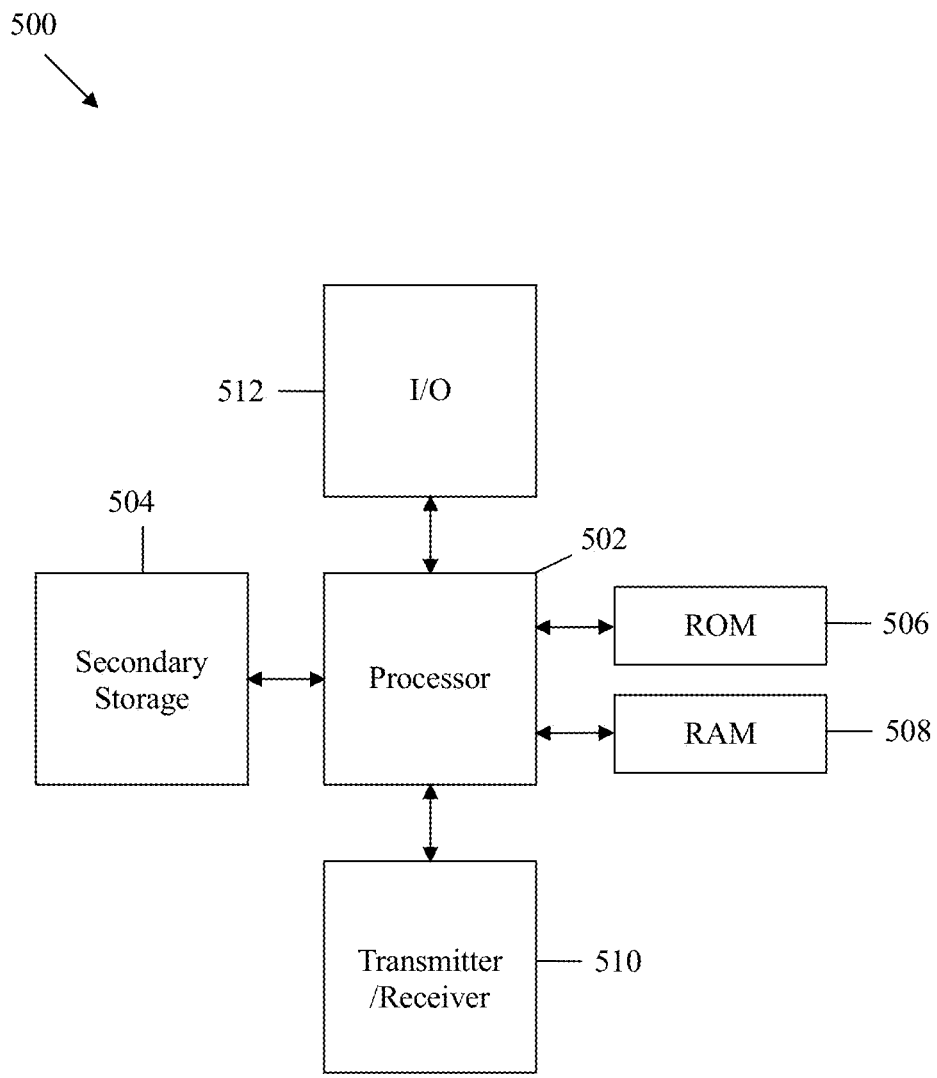
FIG. 5 is a schematic diagram of a general purpose computer system.

The schemes described above may be implemented on any general-purpose computer system, such as a computer or network component with sufficient processing power, memory resources, and network throughput capability to handle the necessary workload placed upon it. FIG. 5 illustrates a schematic diagram of a general-purpose computer system 500 suitable for implementing one or more embodiments of the methods disclosed herein, such as the video encoder 100, the video decoder 200, and the intra prediction method 300. The computer system 500 includes a processor 502 (which may be referred to as a central processor unit or CPU) that is in communication with memory devices including secondary storage 504, read only memory (ROM) 506, random access memory (RAM) 508, transmitter/receiver 510, and input/output (I/O) device 512. Although illustrated as a single processor, the processor 502 is not so limited and may comprise multiple processors. The processor 502 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 502 may be configured to implement any of the schemes, including implementation of pseudo code, described herein, such as the video encoder 100, the video decoder 200, and the intra prediction method 300. The processor 502 may be implemented using hardware, software, or both. For instance, the processor 502 may comprise a special-purpose DSP or ASIC configured or optimized for computing predicted chroma samples according to equations (44) and (45), wherein all multipliers are non-negative integers and have a maximum bit width no greater than an input depth of the luma and chroma components.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504.

The RAM 508 is used to store volatile data and perhaps to store instructions. Access to both the ROM 506 and the RAM 508 is typically faster than to the secondary storage 504.

The transmitter/receiver 510 may serve as an output and/or input device of the video codec 500. For example, if the transmitter/receiver 510 is acting as a transmitter, it may transmit data out of the computer system 500. If the transmitter/receiver 510 is acting as a receiver, it may receive data into the computer system 500. The transmitter/receiver 510 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 510 may enable the processor 502 to communicate with an Internet or one or more intranets. I/O devices 512 may include a video monitor, liquid crystal display (LCD), touch screen display, or other type of video display for displaying video, and may also include a video recording device for capturing video. I/O devices 512 may also include one or more keyboards, mice, or track balls, or other well-known input devices.

It is understood that by programming and/or loading executable instructions onto the computer system 500, at least one of the processor 502, the RAM 508, and the ROM 506 are changed, transforming the computer system 500 in part into a particular machine or apparatus (e.g., a video codec having the novel functionality taught by the present disclosure). It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A video codec comprising:
a processor configured to:
generate a predicted chroma sample for a chroma block based on:

a plurality of reconstructed luma samples located in neighboring blocks of a corresponding reconstructed luma block and adjacent to the corresponding reconstructed luma block, and a plurality of reconstructed chroma samples located in neighboring blocks of the chroma block and adjacent to the chroma block, wherein generating the predicted chroma sample comprises computing a plurality of multipliers, wherein each of the plurality of multipliers has a bit width no greater than an input bit depth of the chroma block, and wherein generating the predicted chroma sample does not require any multiplier that has a bit width greater than the input bit depth of the chroma block, wherein generating the predicted chroma sample further comprises generating a plurality of filtered luma samples by filtering the plurality of reconstructed luma samples, and wherein the plurality of multipliers comprises:

a first flooring function of an average of the plurality of filtered luma samples; and a second flooring function of an average of the plurality of reconstructed chroma samples, wherein the first and second flooring functions are first and second intermediate variables denoted as avgY' and avgC respectively, wherein the plurality of multipliers further comprises:

a third intermediate variable, denoted as RErrY' representing a difference between a sum of the plurality of filtered luma samples and 2*nS*avgY', and a fourth intermediate variable, denoted as RErrC, representing a difference between a sum of the plurality of reconstructed chroma samples and 2*nS*avgC, and wherein nS denotes a width of the chroma block, which equals a number of the plurality of filtered luma samples, wherein generating the predicted chroma sample further comprises computing intermediate variables denoted as a1 and a2 according to the following equations:

$$a1 = LC - (2*nS*avgY'*avgC + avgY'*RErrC + avgC*RErrY');\text{ and}$$

$$a2 = LL - (2*nS*avgY'^2 + 2*avgY'*RErrY').$$

wherein LC and LL are intermediate variables determined by the plurality of reconstructed chroma samples and the plurality of filtered luma samples, and wherein the predicted chroma sample is generated based on a1 and a2, and wherein computing avgY', avgC, RErrY', and RErrC uses the following equations:

$$k0 = \text{Log } 2((2*nS));$$

$$avgY' = L >> k0;$$

$$RErrY' = L \& ((1<<k0)-1);$$

$$avgC = C >> k0;\text{ and}$$

$$RErrC = C \& ((1<<k0)-1),$$

wherein C denotes a sum of the plurality of reconstructed chroma samples, and wherein L denotes a sum of the plurality of filtered luma samples.

2. The video codec of claim 1, wherein BitDepth$_C$ denotes the input bit depth of the chroma block, wherein p$_Y'$[x, y] denotes each of the plurality of filtered luma samples, wherein x and y are integers indicating a position, wherein p[x, y] denotes each of the plurality of reconstructed chroma samples, and wherein generating the predicted chroma sample further comprises determining LL and LC via either equations:

$$k3 = \text{Max}(0, BitDepth_C + \log_2(nS) - 14);$$

$$LL = \left(\sum_{y=0}^{nS-1} p'_Y[-1, y]^2 + \sum_{x=0}^{nS-1} p'_Y[x, -1]^2\right) >> k3;\text{ and}$$

$$LL = \left(\sum_{y=0}^{nS-1} p'_Y[-1, y] * p[-1, y] + \sum_{x=0}^{nS-1} p'_Y[x, -1] * p[x, -1]\right) >> k3$$

or equations:

$$LL = \left(\sum_{y=0}^{nS-1} p'_Y[-1, y]^2 + \sum_{x=0}^{nS-1} p'_Y[x, -1]^2\right);\text{ and}$$

$$LC = \left(\sum_{y=0}^{nS-1} p'_Y[-1, y] * p[-1, y] + \sum_{y=0}^{nS-1} p'_Y[x, -1] * p[x, -1]\right).$$

3. A video codec comprising:

a processor configured to:

generate a predicted chroma sample for a chroma block based on:

a plurality of reconstructed luma samples located in neighboring blocks of a corresponding reconstructed luma block and adjacent to the corresponding reconstructed luma block, and a plurality of reconstructed chroma samples located in neighboring blocks of the chroma block and adjacent to the chroma block, wherein generating the predicted chroma sample comprises computing a plurality of multipliers, wherein each of the plurality of multipliers has a bit width no greater than an input bit depth of the chroma block, and wherein generating the predicted chroma sample does not require any multiplier that has a bit width greater than the input bit depth of the chroma block, wherein generating the predicted chroma sample further comprises generating a plurality of filtered luma samples by filtering the plurality of reconstructed luma samples, and wherein the plurality of multipliers comprises:

a first flooring function of an average of the plurality of filtered luma samples; and a second flooring function of an average of the plurality of reconstructed chroma samples, wherein the first and second flooring functions are first and second intermediate variables denoted as avgY' and avgC respectively, wherein the plurality of multipliers further comprises:

a third intermediate variable, denoted as RErrY', representing a difference between a sum of the plurality of filtered luma samples and 2*nS*avgY', and a fourth intermediate variable, denoted as RErrC, representing a difference between a sum of the plurality of reconstructed chroma samples and 2*nS*avgC, and wherein nS denotes a width of the chroma block, which equals a number of the plurality of filtered luma samples, wherein generating the predicted chroma sample further comprises computing intermediate variables denoted as a1 and a2 according to the following equations:

$$a1 = LC - (2*nS*avgY'*avgC + avgY'*RErrC + avgC*RErrY'); \text{ and}$$

$$a2 = LL - (2*nS*avgY'^2 + 2*avgY'*RErrY').$$

wherein LC and LL are intermediate variables determined by the plurality of reconstructed chroma samples and the plurality of filtered luma samples, and wherein the predicted chroma sample is generated based on a1 and a2, and wherein $BitDepth_C$ denotes the input bit depth of the chroma block, wherein the plurality of multipliers further comprises an intermediate variable denoted as a1s, and wherein computing a1s follows equations:

$$k1 = \text{Max}(0, \log_2(\text{abs}(a1)) - BitDepth_C + 2); \text{ and}$$

$$a1s = a1 >> k1.$$

4. The video codec of claim 3, wherein the plurality of multipliers further comprises an intermediate variable denoted as a2t, and wherein a2t is computed based on an intermediate variable a2s following either equations:

$$a2t = a2s < 1 ? 0 : (1m \text{ Div } [a2s] + (1 << 15 - BitDepth_C - 1))) >> (15 - BitDepth_C));$$

and $$a2t = \text{Clip1}_C(a2t),$$

or equations:

$$a2t = a2s < 32 ? 0 : (1m \text{ Div } [a2s] + (1 << (15 - BitDepth_C - 1)))) >> (15 - BitDepth_C));$$

and $$a2t = \text{Clip1}_C(a2t).$$

5. The video codec of claim 1, wherein the input bit depth equals 8 or 10, and wherein the width of the chroma block is no less than 4 and no greater than 16.

6. The video codec of claim 1, wherein the processor is further configured to:
generate a residual sample indicating a difference between the predicted chroma sample and a corresponding chroma sample in the chroma block; and
entropy encode the residual sample to generate an encoded residual sample.

7. The video codec of claim 1, wherein the processor is further configured to:
decode an encoded residual sample to generate a decoded residual sample; and
combine the decoded residual sample and the predicted chroma sample to generate a corresponding chroma sample in the chroma block.

8. A method used in video coding comprising:
generating, using a processor of a video codec, a predicted chroma sample for a chroma block based on:

a plurality of reconstructed luma samples located in neighboring blocks of a corresponding reconstructed luma block and adjacent to the corresponding reconstructed luma block, and
a plurality of reconstructed chroma samples located in neighboring blocks of the chroma block and adjacent to the chroma block,
wherein generating the predicted chroma sample comprises computing a plurality of multipliers, wherein each of the plurality of multipliers has a bit width no greater than an input bit depth of the chroma block, and wherein generating the predicted chroma sample does not require any multiplier that has a bit width greater than the input bit depth of the chroma block,
wherein generating the predicted chroma sample further comprises generating a plurality of filtered luma samples by filtering the plurality of reconstructed luma samples, and wherein the plurality of multipliers comprises:
a first flooring function of an average of the plurality of filtered luma samples; and
a second flooring function of an average of the plurality of reconstructed chroma samples,
wherein the first and second flooring functions are first and second intermediate variable denoted as avgY' and avgC respectively, wherein the plurality of multipliers further comprises:
a third intermediate variable, denoted as RErrY', representing a difference between a sum of the plurality of filtered luma samples and 2*nS*avgY', and
a fourth intermediate variable, denoted as RErrC, representing a difference between a sum of the plurality of reconstructed chroma samples and 2*nS*avgC, and wherein nS denotes a width of the chroma block, which equals a number of the plurality of filtered luma samples,
wherein generating the predicted chroma sample further comprises computing intermediate variables denoted as a1 and a2 according to the following equations:

$$a1 = LC - (2*nS*avgY'*avgC + avgY'*RErrC + avgC*RErrY'); \text{ and}$$

$$a2 = LL - (2*nS*avgY'^2 + 2*avgY'*RErrY').$$

wherein LC and LL are intermediate variables determined by the plurality of reconstructed chroma samples and the plurality of filtered luma samples, and wherein the predicted chroma sample is generated based on a1 and a2, and wherein $BitDepth_C$ denotes the input bit depth of the chroma block, wherein the plurality of multipliers further comprises an intermediate variable denoted as a1s, and wherein computing a1s follows equations:

$$k1 = \text{Max}(0, \log_2(\text{abs}(a1)) - BitDepth_C + 2); \text{ and}$$

$$a1s = a1 >> k1.$$

* * * * *

UNITED STATES PATENT AND TRADEMARK OFFICE
CERTIFICATE OF CORRECTION

PATENT NO.         : 9,438,905 B2
APPLICATION NO.    : 13/802525
DATED              : September 6, 2016
INVENTOR(S)        : Lingzhi Liu Page 1 of 1

It is certified that error appears in the above-identified patent and that said Letters Patent is hereby corrected as shown below:

In the Claims

Column 27, Lines 64-67, through Column 28, Lines 1-23, Claim 2 should read:
2. The video codec of claim 1, wherein $BitDepth_C$ denotes the input bit depth of the chroma block, therein $p_Y'[x, y]$ denotes each of the plurality of filtered luma samples, wherein x and y are integers indicating a position, wherein $p[x, y]$ denotes each of the plurality of reconstructed chroma samples, and wherein generating the predicted chroma sample further comprises determining LL and LC via
either equations:

$$k3 = Max(0, BitDepth_C + \log_2(nS) - 14);$$

$$LL = \left( \sum_{y=0}^{nS-1} p_Y'[-1, y]^2 + \sum_{x=0}^{nS-1} p_Y'[x, -1]^2 \right) >> k3; and$$

$$LC = \left( \sum_{y=0}^{nS-1} p_Y'[-1, y] * p[-1, y] + \sum_{x=0}^{nS-1} p_Y'[x, -1] * p[x, -1] \right) >> k3$$

or equations:

$$LL = \left( \sum_{y=0}^{nS-1} p_Y'[-1, y]^2 + \sum_{x=0}^{nS-1} p_Y'[x, -1]^2 \right); and$$

$$LC = \left( \sum_{y=0}^{nS-1} p_Y'[-1, y] * p[-1, y] + \sum_{x=0}^{nS-1} p_Y'[x, -1] * p[x, -1] \right).$$

Signed and Sealed this
Thirty-first Day of January, 2017

Michelle K. Lee
*Director of the United States Patent and Trademark Office*